Patented Dec. 31, 1940

2,227,277

UNITED STATES PATENT OFFICE 2,227,277

PROCESS OF MAKING THREADS, BANDS, STRIPS, AND TAPES OF RUBBER

Thomas Lewis Shepherd, Portslade, England, assignor to The Clark Thread Company, a corporation of New Jersey No Drawing. Application June 14, 1937, Serial No. 148,218. In Great Britain June 26, 1936

7 Claims. (Cl. 18—54)

This invention relates to processes in the handling or treatment of bands, strips, tapes or threads of rubber or rubber-like materials after they have been formed, for instance by extruding a mix including latex of the Hevea brazilensis through a nozzle into a bath including acetic acid. After such extrusion I usually remove the resultant coagulum, in the form of a thread, from the acid bath and to allow it to accumulate in an alcohol bath, which hardens the thread and enables it to be more easily handled. The thread is then drawn off, powdered, and used or treated as desired, for instance dried and vulcanised.

It is found that when the thread accumulates in the alcohol bath, there is a tendency for the coils to stick together, and this is apparent when the thread is removed from the bath. This tendency is particularly marked in the case of threads made in accordance with British patent applications Nos. 447,972, 449,314, 459,434 and 467,083.

I have found that it is possible to overcome or reduce the effects of this disadvantage by the addition of certain substances in solution to the alcohol bath. These substances are those alums which contain aluminium sulphate, but aluminium sulphate is also suitable.

Instead of the aluminium sulphate or alum containing the same being added to the alcohol bath, such substances may be contained in the coagulating bath itself, or they may be sprayed on to the thread, or these substances may be employed in any other suitable way.

The invention consists in subjecting threads, bands, strips or tapes of rubber or rubber-like materials after the same have been formed for example by extrusion, to treatment with a solution of aluminium sulphate or an alum containing the same, the treatment being effected prior to or simultaneously with or after the treatment of the threads, bands, strips or tapes in a hardening bath, whereby the coils of material produced are prevented from sticking together.

Other features of the invention are hereinafter fully described and claimed in the appended claims.

If desired the hardening treatment may be effected during coagulation, these two treatments taking place in the presence of aluminium sulphate or an alum containing the same.

The threads, bands, strips or tapes of rubber or rubber-like material may be formed from a mixture of a dispersion of rubber such as latex with glue or gelatine, or if desired these may be replaced by like proteins such as casein, albumen, natural or synthetic resins and gums which are water soluble, cellulose esters or ethers (e. g. methyl cellulose) and inorganic (e. g. sodium silicate) or organic substances (e. g. sugar) which dissolve in water to give solutions which are miscible with the latex without coagulation.

If desired the treatment with aluminium sulphate or an alum containing the same may be effected by spraying the threads, bands, strips or tapes of rubber therewith after they have been coagulated but prior to the treatment in the hardening bath.

In carrying the invention into effect in one form by way of example, a bath of the following composition may be used:

| | Parts by weight |
|---|---|
| Ethyl alcohol (industrial spirits) | 1050 |
| Water | 1050 |
| Ammonium chloride | 98 |
| Zinc sulphate | 77 |
| Sodium chloride | 77 |
| Aluminium sulphate | 80 |

Into such a bath there is extruded through a nozzle a mixture including glue and latex, such as is described in the applications mentioned above. The bath acts both as a coagulant and hardening bath, causing a thread of coagulum to form, and also in the way mentioned above to render the loose threads in the bath less likely to stick together due to the presence of the aluminium sulphate.

In a modification, the coagulating bath is formed of:

| | Parts by weight |
|---|---|
| Ethyl alcohol | 500 |
| Water | 525 |
| Ammonium chloride | 70 |
| Sodium chloride | 50 |
| Zinc sulphate | 50 |

The coagulum is then passed through a bath containing a 20% aqueous solution of aluminium sulphate and collected on a spool or in any convenient receiver. Before the thread has time to dry it is immersed in a bath of alcohol (ethyl) for five minutes, so as to complete the coagulation of the latex and the glue. At the end of this period it is run through French chalk, bobbined or hanked and finally completely dried.

Instead of or in addition to aluminium sulphate, as mentioned above, alums containing aluminium sulphate may be employed. Ammonium alum and potash alum are very suitable.

As above indicated, the aluminium sulphate or alum containing the same say be mixed in a hardening bath which may contain ethyl alcohol or acetone.

I claim:

1. The process of making threads, bands, strips or tapes of rubber, comprising extruding a compounded aqueous dispersion of rubber and treating said extruded rubber dispersion with a coagulating medium, an alcoholic hardening medium and a solution of aluminum sulfate.

2. The process as claimed in claim 1 in which a solution of an alum containing aluminium sulphate is employed.

3. The process of making threads, bands, strips or tapes of rubber, comprising extruding a compounded aqueous dispersion of rubber into a coagulating and alcoholic hardening bath and treating the extruded product thus formed with a solution containing aluminium sulphate.

4. The process as claimed in claim 1 wherein the coagulation, alcoholic hardening and aluminium sulphate treatment is effected in a bath of approximately the following composition:

|                               | Parts by weight |
|-------------------------------|-----------------|
| Ethyl alcohol (industrial spirits) | 1050        |
| Water                         | 1050            |
| Ammonium chloride             | 98              |
| Zinc sulphate                 | 77              |
| Sodium chloride               | 77              |
| Aluminium sulphate            | 80              |

5. The process as claimed in claim 1, wherein the extruded rubber dispersion is treated with the solution of aluminum sulphate simultaneously with the treatment with the coagulating medium and alcoholic hardening medium.

6. Process of making threads, bands, strips or tapes of rubber, comprising: extruding a compounded aqueous dispersion of rubber into a coagulating and alcoholic hardening bath of the following composition followed by treatment in a bath containing a 20% aqueous solution of aluminum sulfate:

|                    | Parts by weight |
|--------------------|-----------------|
| Ethyl alcohol      | 500             |
| Water              | 525             |
| Ammonium chloride  | 70              |
| Sodium chloride    | 50              |
| Zinc sulfate       | 50              |

7. Process of making threads, bands, strips or tapes of rubber, comprising: extruding a compounded aqueous dispersion of rubber, treating said extruded rubber dispersion with a coagulating medium and an alcoholic hardening medium, and thereafter spraying with an aqueous solution of aluminum sulfate.

THOMAS LEWIS SHEPHERD.